United States Patent
Compton et al.

(10) Patent No.: US 6,302,027 B1
(45) Date of Patent: *Oct. 16, 2001

(54) PACKAGED EXPLOSIVE PRODUCT AND PACKAGING PROCESS THEREFOR

(75) Inventors: Stephen Floyd Compton, Spartanburg; Parimal M. Vadhar, Greer, both of SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,807

(22) Filed: Jun. 25, 1998

Related U.S. Application Data

(60) Provisional application No. 60/051,328, filed on Jun. 30, 1997.

(51) Int. Cl.$^7$ .................................................. F42B 3/00
(52) U.S. Cl. ................................ 102/323; 102/324
(58) Field of Search .................................. 102/323, 324

(56) References Cited

U.S. PATENT DOCUMENTS

| | | | |
|---|---|---|---|
| 2,831,302 | 4/1958 | Jensen et al. | 53/138 |
| 2,956,383 | 10/1960 | Gausman | 53/124 |
| 2,966,855 | * 1/1961 | Barco | 102/323 |
| 3,049,079 | * 8/1962 | Eilo | 102/324 |
| 3,340,129 | 9/1967 | Greich | 156/498 |
| 3,383,746 | 5/1968 | Narduzzi et al. | 29/33.5 |
| 3,552,090 | 1/1971 | Roberts et al. | 53/71 |
| 3,611,657 | 10/1971 | Inque et al. | 53/64 |
| 3,628,576 | 12/1971 | Owen | 141/65 |
| 3,703,396 | 11/1972 | Lamanche et al. | 117/21 |
| 3,731,625 | 5/1973 | Slawinski | 102/24 |
| 3,791,297 | 2/1974 | McKee | 102/24 |
| 3,921,529 | 11/1975 | McKee | 102/24 |
| 4,052,939 | 10/1977 | Simmons et al. | 102/24 |
| 4,064,296 | 12/1977 | Bornstein et al. | 428/35 |

(List continued on next page.)

FOREIGN PATENT DOCUMENTS

| | | |
|---|---|---|
| 1003693 | 1/1977 | (CA) . |
| 0 017 496 | 10/1980 | (EP) . |
| 0 369 447 | 5/1990 | (EP) . |
| 0 519 251 | 12/1992 | (EP) . |
| 1 334 616 | 10/1973 | (GB) . |
| 62-261422 | 11/1987 | (JP) . |
| 7-324896 | 12/1995 | (JP) . |
| WO 90/03414 | 5/1990 | (WO) . |
| WO 93/03093 | 2/1993 | (WO) . |

OTHER PUBLICATIONS

ASTM D882, "Standard Test Methods for Tensile Properites of Thin Plastic Sheeting", 1992, pp. 194–199.
ASTM D2732, "Standard Test Method for Unrestrained Linear Thermal Shrinkage of Plastic Film and Sheeting", 1989, pp. 368–371.

*Primary Examiner*—Peter A. Nelson
(74) *Attorney, Agent, or Firm*—Rupert B. Hurley, Jr.

(57) ABSTRACT

A packaged product has an explosive article packaged in a film. Although the film can comprise any one or more of a wide variety of polymers, the film is non-crosslaminated and is sealed to itself, and has a total free shrink at 185° F. of less than about 5 percent. The explosive article preferably comprises a flowable explosive composition. Preferably the film is lap-sealed along its length and clipped at the ends, with the package being in the form of a chub. The relatively low total free shrink at 185° F. enables the film to be used in a vertical-form-fill-and-seal packaging process in which a lap-seal is formed using a hot-melt adhesive composition. The relatively low free shrink of the film allows the film to be sealed using a hot melt type adhesive, without the film shrinking back to such an extent that the resulting seal is defective.

18 Claims, 6 Drawing Sheets

U.S. PATENT DOCUMENTS

| | | | |
|---|---|---|---|
| 4,103,473 | 8/1978 | Bast et al. | 53/180 |
| 4,120,716 | 10/1978 | Bonet | 156/272 |
| 4,205,611 * | 6/1980 | Slawinski | 102/324 |
| 4,302,565 | 11/1981 | Goeke et al. | 526/88 |
| 4,302,566 | 11/1981 | Karol et al. | 526/125 |
| 4,422,382 | 12/1983 | Marz | 102/331 |
| 4,506,494 | 3/1985 | Shimoyama et al. | 53/551 |
| 4,532,752 | 8/1985 | Taylor | 53/451 |
| 4,532,753 | 8/1985 | Kovacs | 53/451 |
| 4,571,926 | 2/1986 | Scully | 53/525 |
| 4,589,247 | 5/1986 | Tsuruta et al. | 53/550 |
| 4,755,403 | 7/1988 | Ferguson | 428/35 |
| 4,879,430 | 11/1989 | Hoffman | 428/35.1 |
| 5,206,075 | 4/1993 | Hodgson, Jr. | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,374,459 | 12/1994 | Mumpower et al. | 428/36.7 |
| 5,491,019 | 2/1996 | Kuo | 428/213 |
| 5,565,160 | 10/1996 | Makuuchi et al. | 264/485 |
| 5,625,162 * | 4/1997 | Appleby | 102/324 X |

\* cited by examiner

PACKAGED EXPLOSIVE PRODUCT AND PACKAGING PROCESS THEREFOR

This application claims the benefit of provisional application No. 60/051,328, filed on Jun. 30, 1997.

FIELD OF THE INVENTION

The present invention relates to the packaging of various products, especially products which are packaged using vertical-form-fill-and-seal (VFFS) packaging machinery. The present invention is particularly concerned with the packaging of explosive products in thermoplastic film. The present invention also relates to packaged products in which the packaging material comprises a thermoplastic film, especially to such packaged products in which the product is an explosive.

BACKGROUND OF THE INVENTION

For some time many flowable liquid and flowable solid products have been packaged in thermoplastic packaging films, such a polyethylene, polypropylene, etc, using vertical-form-fill-and-seal packaging equipment. The packaging of explosive compositions, such as ammonium nitrate, has used vertical-form-fill-and-seal equipment, in which the explosive ammonium nitrate composition has the viscosity of a soft putty, and hence is flowable.

In the past, vertical-form-fill-and-seal packaging of ammonium nitrate has utilized a high strength flexible film packaging material marketed by Van Leer Flexibles, Inc. of Houston, Tex., i.e., VALERON® strength film. VALERON® strength film is made from high density oriented and cross-laminated polyethylene, and is stated as being puncture-resistant, tear-resistant, and chemical-resistant. VALERON® strength film is also stated as being strong, with a smooth surface, balanced tear-resistance, of uniform thickness, and is printable with solvent-based and water-based inks, and is laminatable to paper, film, and other substrates. VALERON® strength film is also stated as maintaining its properties in harsh environments and as having a temperature operating range of from −70° F. to over 200° F., and as being useful in the flexible packaging, shipping, construction, agricultural, photographic, and tag & label industries. VALERON® strength film is stated as having much better tear-resistance than single-ply film of the same overall thickness and of the same polymer which has been biaxially oriented. VALERON® strength film has also been stated to provide improvements over even other cross-laminated films because it is annealed, i.e., subjected to an elevated temperature (i.e., from 35° C. to below the lowest melting point of the thermoplastic material present, excluding any adhesive or bonding layer). The annealing process reportedly provides VALERON® strength film with a higher impact strength relative to corresponding unannealed films.

In the packaging of explosive products in VALERON® strength film using vertical-form-fill-and-seal equipment, at least one bead, and preferably two beads, of a molten thermoplastic material, such as polyethylene homopolymer or copolymer, especially ethylene/vinyl acetate copolymer, or NOVACOR® SC7250 SCLAIRCOAT polyethylene, obtained from Nova Chemical, of Alberta, Canada, have been used in order to form a lap seal along the length of the resulting package, which contains a "chub" of the explosive product. It is important that the resulting package does not burst when dropped onto a hard surface (or water) from a distance of from 10 to 50 or more feet. The use of the molten plastic adhesive is apparently needed to ensure adequate seal strength and adequate water resistance. If the film bursts, the explosive composition could be exposed to water or other contamination which impairs its ability to explode.

Thus, it is necessary to provide a packaging film for explosives which can be sealed using vertical form fill and seal equipment, so that the resulting packaging material, when sealed around the explosive article, does not burst when it is dropped onto a hard surface (or water) from a significant height. Although VALERON® strength film has been used for this purpose, is a relatively expensive product, i.e., compared with other packaging films. This expense is undoubtedly associated with the costs of cross-laminating and annealing. It would be desirable to provide high strength, flexible film packaging which can be sealed using vertical form fill and seal packaging equipment in a manner which yields performance characteristics comparable to VALERON® strength film, but which is less complex to manufacture.

SUMMARY OF THE INVENTION

An initial attempt to use a commercially available packaging film on a vertical form fill and seal apparatus failed to provide a satisfactory package for the packaging of an explosive article, because the film exhibited too much shrink upon exposure to the molten thermoplastic adhesive. That is, the hot thermoplastic adhesive used to make the lap seal running the length of the chub was found to cause the overlapping portions of the film to shrink back and away from one another, thereby destroying the ability of the film to form the desired lap seal. However, this problem has been solved through the use of a non-crosslaminated, high strength film which has a level of free shrink at 185° F. which is low enough to avoid the shrink-back problem encountered in the formation of the lap seal using a film having a higher free shrink.

As a first aspect, the present invention is directed to a packaged product comprising a non-crosslaminated film surrounding a product. The non-crosslaminated film comprises at least one member selected from the group consisting of linear low density polyethylene, high density polyethylene, homogeneous ethylene/alpha-olefin copolymer, polycarbonate, polyester homopolymer, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, and ethylene/styrene copolymer. The non-crosslaminated film having a total free shrink at 185° F. of less than about 5 percent (preferably, a total free shrink at 185° F. of from about 0 to 4 percent; still more preferably, a total free shrink at 185° F. of from about 0 to 3 percent). The product comprises an explosive composition. The non-crosslaminated film is sealed to itself. Preferably, the non-crosslaminated film is sealed to itself in a lap seal comprising a thermoplastic adhesive.

Preferably, the explosive composition comprises at least one member selected from the group consisting of ammonium nitrate, nitroglycerine, diethylene glycol dinitrate, nitroglycerin, trinitrotoluene, nitrocellulose, mercury fulminate, lead azide, silver acetylide, diazodinitrophenol, nitrosoguanidine, lead styphnate, and pentaerythritol tetranitrate, and a mixture of potassium nitrate, charcoal, and sulfur, more preferably, ammonium nitrate.

Preferably, the explosive composition has a shape of a chub, i.e., an elongated article having a circular cross-section, with the film being sealed at each end (preferably gathered and sealed with a metal clip at each end).

One preferred non-crosslaminated film comprises: (A) a first layer comprising at least one member selected from the group consisting of polyethylene homopolymer, ethylene/alpha-olefin copolymer, ethylene/ester copolymer, ionomer, polyamide, and polyester; (B) a second layer comprising at least one member selected from the group consisting of ethylene/ester copolymer, modified polyolefin, ionomer, ethylene acrylate copolymer, ethylene acrylic acid, polyamide, and polyurethane; (C) a third layer comprising at least one member selected from the group consisting of ethylene/ester copolymer, modified polyolefin, ionomer, ethylene acrylate copolymer, ethylene acrylic acid, polyamide, and polyurethane; (D) a fourth layer comprising at least one member selected from the group consisting of polyethylene homopolymer, ethylene/alpha-olefin copolymer, ethylene/ester copolymer, ionomer, polyamide, and polyester; and, (E) a fifth layer comprising at least one member selected from the group consisting of high density polyethylene, polypropylene, polyester, polystyrene, and polyamide. In this film, the second layer is between the first layer and the third layer, the third layer is between the second layer and the fourth layer and is directly adhered to the second layer, and the fourth layer is between the third layer and the fifth layer. Preferably, the fifth layer comprises high density polyethylene. Preferably, the second and third film layers comprise ethylene/unsaturated ester copolymer (more preferably, ethylene/vinyl acetate copolymer).

Preferably, the non-crosslaminated film has an average tensile strength at break of at least 4000 psi; more preferably, from about 4000 to 15000 psi; still more preferably, from about 7000 to 11000 psi.

Preferably, the non-crosslaminated film has an average tear propagation (i.e., the sum of tear propagation in the machine direction and tear propagation in the transverse direction, divided by 2) of from about 50 to 800 grams; more preferably, from about 200–600 grams.

At least one layer of the multilayer film can comprise pigment.

Preferably, the non-crosslaminated film has a Young's modulus of at least about 30,000 psi; more preferably, from about 30,000 to about 150,000 psi; still more preferably, from about 40,000 to 100,000 psi; yet still more preferably, from about 50,000 to 90,000 psi.

As a second aspect, the present invention pertains to a packaging process for packaging an explosive composition. The process comprises: (A) supplying, to a vertical form fill and seal apparatus, a rollstock comprising a non-crosslaminated film in accordance with the first aspect of the present invention, described above; (B) forming a substantially vertically-oriented tube from the non-crosslaminated multilayer film, by passing the non-crosslaminated film over a collar member of the vertical form fill and seal apparatus, so that substantially vertically-oriented edge portions of the film are adjacent one another; (C) forming a longitudinal seal along at least a segment of the adjacent edge portions of the non-crosslaminated film, to form a sealed tube segment; (D) collapsing a lower end portion of the sealed tube segment, and forming a bottom package seal across the collapsed lower end portion of the sealed tube segment, to form a pouch; (E) adding an appropriate quantity of the explosive composition to the pouch; (F) collapsing an upper end portion of the pouch, and forming a top package seal across the collapsed upper end portion to form a sealed pouch containing the explosive composition, whereby a package is formed; and (G) severing the package from a remainder of the rollstock.

Preferably, the longitudinal seal comprises applying a molten thermoplastic adhesive resin between overlapping regions of the non-crosslaminated film. Preferably, the molten thermoplastic adhesive is applied as at least one continuous bead along an entire length of the overlapping regions of the non-crosslaminated film. More preferably, a pair of continuous beads of the molten thermoplastic adhesive are applied as continuous beads along the entire length of the overlapping regions of the non-crosslaminated film.

As a third aspect, the present invention is directed to a non-crosslaminated multilayer film comprising: (A) a first layer comprising at least one member selected from the group consisting of polyethylene homopolymer, ethylene/alpha-olefin copolymer, ethylene/ester copolymer, ionomer, polyamide, and polyester; (B) a second layer comprising at least one member selected from the group consisting of ethylene/ester copolymer, modified polyolefin, ionomer, ethylene acrylate copolymer, ethylene acrylic acid, polyamide, and polyurethane; (C) a third layer comprising at least one member selected from the group consisting of ethylene/ester copolymer, modified polyolefin, ionomer, ethylene acrylate copolymer, ethylene acrylic acid, polyamide, and polyurethane; (D) a fourth layer comprising at least one member selected from the group consisting of polyethylene homopolymer, ethylene/alpha-olefin copolymer, ethylene/ester copolymer, ionomer, polyamide, and polyester; and (E) a fifth layer comprising at least one member selected from the group consisting of high density polyethylene, polypropylene, polyester, polystyrene, and polyamide. The second layer is between the first layer and the third layer, the third layer is between the second layer and the fourth layer and is directly adhered to the second layer, and the fourth layer is between the third layer and the fifth layer. Preferably, the film is transparent. Preferably, the fifth layer comprises high density polyethylene. Preferably, the second and third film layers comprise ethylene/unsaturated ester copolymer.

DETAILED DESCRIPTION OF THE INVENTION

Figure 1:
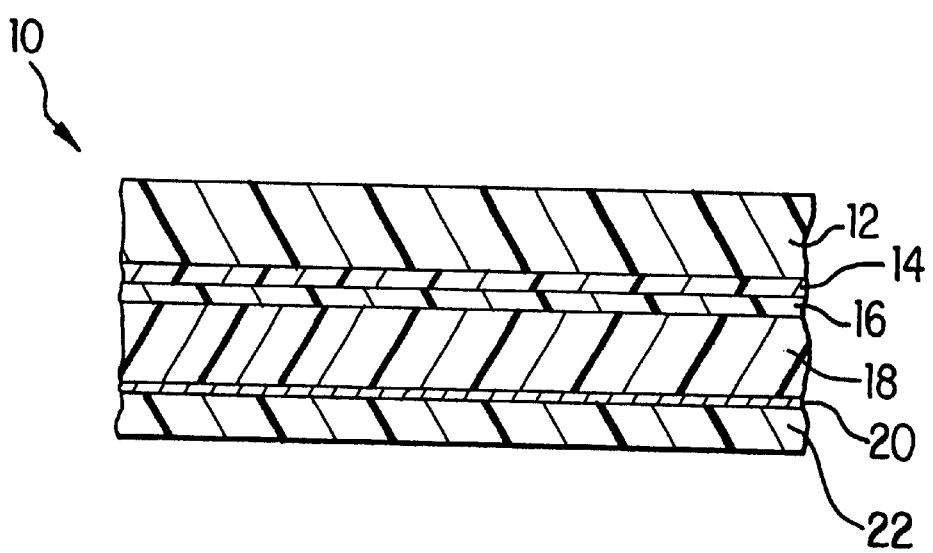
FIG. 1 illustrates a cross-sectional view of a multilayer film for use in the packaged product of the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of an outer film surface to a second region of an outer film surface (of the same film to itself, or of two different films to one another), wherein the seal can be formed by melting regions of each of the two films, through the use of an adhesive, and/or even the use of one or more metal clips, as commonly used to seal the ends of sausage chubs (as well as in the vertical-form-fill-and-seal packaging of explosive compositions). The adhesive can be a hot-melt type of adhesive, or a room temperature adhesive, such as a cyanoacrylate adhesive, a styrene-based adhesive, or is formed by heating the regions to at least their respective seal initiation temperatures. The sealing can be performed by any one or more of a wide variety of manners, such as using a heat seal technique (e.g., melt-bead sealing, thermal sealing, impulse sealing, dielectric sealing, radio frequency sealing, ultrasonic sealing, hot air, hot wire, infrared radiation, etc).

As used herein, the terms "lamination," "laminate," as well as the phrase "laminated film," refer to the process, and resulting product made by bonding together two or more layers of film or other materials. Lamination can be accomplished by joining layers with adhesives, joining with heat and pressure, with corona treatment, and even spread coating and extrusion coating. Lamination is described in U.S. Pat. No. 5,374,459, to Mumpower et al. Lamination can be carried out by the application of polyurethane or other conventional lamination adhesive to either or both of the substrate films. Bonding is accomplished by techniques well known in the lamination art.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." As used herein, the phrase "total orientation" refers to the sum of the orientation in the longitudinal direction (machine direction) plus orientation in the transverse direction. In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an etlylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e., named, in terms of the monomers from which the copolymers are produced. For example, the phase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous etylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer, as well as modified polymers made by derivitization of a polymer after its polymerization. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

The term "ionomer", as used herein, refers to a product of an ionic polymerization, i.e., a polymer containing interchain ionic bonding. Preferably, the ionomer comprises at least one member selected from the group consisting of a thermoplastic resin based on metal salt of an alkene/acid copolymer; more preferably, a thermoplastic resin based on metal salt of ethylene/acid copolymer, still more preferably, metal salt of ethylene/methacrylic acid copolymer. As used herein, the term "ionomer" also includes ethylene/acrylic acid copolymer and ethylene/acid/acrylate terpolymer.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company, of Midland, Mich.), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die. Moreover, and outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc), polyamide, polyester (e.g., polyethylene terephthalate glycol), ethylene/ester copolymer (e.g., ethylene/vinyl acetate copolymer), ionomer, etc.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated in its entirety, by reference thereto.

As used herein, the phrase "average tensile strength at break" refers to the average of the tensile strength in the longitudinal direction and the tensile strength in the transverse direction. Tensile strength is measured in accordance with ASTM D882-95, hereby incorporated in its entirety, by reference thereto.

The multilayer films useful in the article and process of the present invention has at least 4 layers (preferably from 4 to 20 layers), and preferably has from 4 to 12 layers; still more preferably, from 4 to 11 layers; and yet still more preferably, from 6 to 10 layers). However, so long as the multilayer film has at least 4 layers, the multilayer film can have any further number of additional layers desired, so long as the film provides the desired properties for the particular packaging operation in which the film is used, e.g. $O_2$-barrier characteristics, optics, modulus, seal strength, etc. The multilayer film illustrated in FIG. 1 comprises 6 layers.

The multilayer film used in the present invention can have any total thickness desired, so long as the film provides the desired properties for the particular packaging operation in which the film is used. Preferably, the film has a total thickness of less than about 20 mils, more preferably the film has a total thickness of from about 2 to 20 mils, still more preferably from about 3 to 12 mils, and yet still more preferably, from about 4 to 8 mils.

Optionally, but preferably, the film of the present invention is irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 0.5–15 MR (5–150 kGy), more preferably 1–8 MR (10–80 kGy), still more preferably, about 3 to 5 MR (30–50 kGy). As can be seen from the descriptions of preferred films for use in the present invention, the most preferred amount of radiation is dependent upon the film composition, thickness, etc., and its end use. Chemical crosslinking can also be utilized, together with electronic crosslinking, or in place of electronic crosslinking.

As is known to those of skill in the art, various polymer modifiers may be incorporated for the purpose of improving toughness and/or orientability or extensibility of the film. Other modifiers which may be added include: modifiers which improve low temperature toughness or impact strength, and modifiers which reduce modulus or stiffness. Exemplary modifiers include: styrene-butadiene, styrene-isoprene, and ethylene-propylene.

Preferably, the outer layer or layers of the multilayer film used in the present invention which contact the vertical-form-fill-and-seal forming collar, or other equpment in the processing or use of the film, are provided with one or more slip and/or antiblock agents. It is especially desirable to provide the film with a slip and antiblock agent on its surface which contacts the forming collar of the vertical-form-fill-and-seal equipment. A preferred antiblock is 10–183 ACP SYLOID® antiblock concentrate, obtained from Tecknor Color, of Pawtuxet, R.I.

As stated above, one or more layers in the multilayer film in the article of the present invention can comprise polystyrene. Polystyrene is relatively brittle and stiff (i.e., high modulus) in comparison with ethylene based polymers, and also has relatively low elongation in comparison with ethylene based polymers. Orientation can be used to improve the toughness of polystyrene. In addition, blending of particulate rubber with polystyrene improves the impact strength of the polystyrene. Such blends are referred to as High Impact Polystyrene (HIPS). Still, HIPS is relatively brittle. It has been found that brittleness can be reduced by blending with the polystyrene styrene-butadiene copolymer and/or styrene-isoprene copolymer. Conventional polystyrene, as well as high impact polystyrene, are available from both The Dow Chemical Company and BASF Corporation.

FIG. 1 illustrates a cross-sectional view of preferred 6-layer film 10 in accordance with the present invention. Film 10 preferably has:

(1) first layer 12, which is an outer layer which serves as a seal and abuse layer, and which preferably comprises a blend of EVA and LLDPE or 100% LLDPE;

(2) second layer 14, which is an inner layer and which serves as a self-weld layer, and which preferably comprises 100% EVA;

(3) third layer 16, which is also an inner layer and which also serves as a self-weld layer, and which preferably comprises 100% EVA;

(4) fourth layer 18, which is an inner layer which serves a bulk and opacity layer, and which preferably comprises a blend of EVA and LLDPE or 100% LLDPE;

(5) fifth layer 20, which is an inner layer which serves as an adhesive layer, and which preferably comprises a urethane-based adhesive;

(6) sixth layer 22, which is an outer film layer which serves as a moisture barrier layer, and which preferably comprises at least one member selected from the group consisting of high density polyethylene, polypropylene (especially biaxially oriented polypropylene), polyester, polystyrene, and polyamide. Preferably, sixth layer 22 comprises high density polyethylene.

Figure 2:
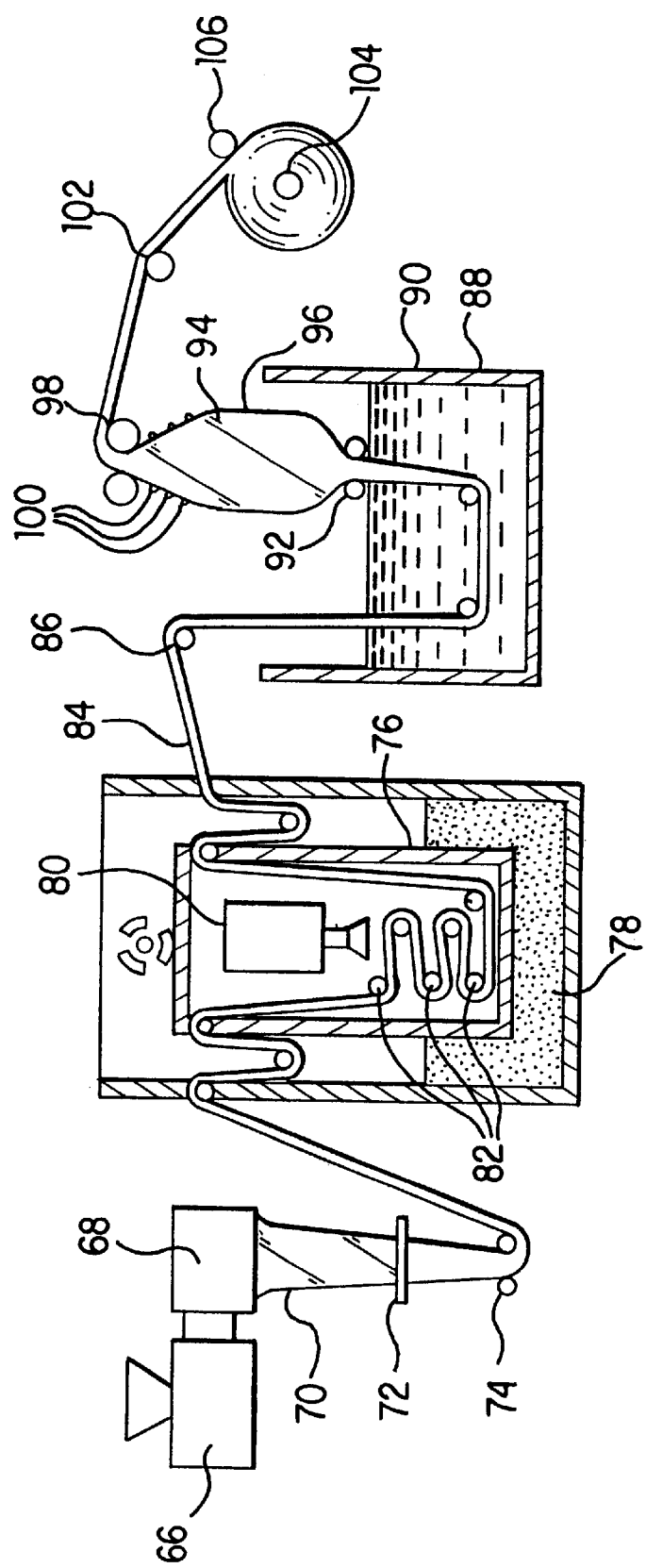
FIG. 2 illustrates a schematic view of a preferred process for making a first component film for use in the packaged product of the invention.

FIG. 2 illustrates a schematic of a preferred process for producing a substrate film which makes up at least the first, second, third, ninth, and tenth layers of the multilayer films of FIG. 1. In the process illustrated in FIG. 2, solid polymer beads (not illustrated) are fed to a plurality of extruders 66 (for simplicity, only one extruder is illustrated). Inside extruders 66, the polymer beads are forwarded, melted, and degassed, following which the resulting bubble-free melt is forwarded into die head 68, and extruded through annular die, resulting in tubing 70, which is 5–40 mils thick, more preferably 20–30 mils thick, still more preferably, about 25 mils thick.

After cooling or quenching by water spray from cooling ring 72, tubing 70 is collapsed by pinch rolls 74, and is thereafter fed through irradiation vault 76 surrounded by shielding 78, where tubing 70 is irradiated with high energy electrons (i.e., ionizing radiation) from iron core transformer accelerator 80. Tubing 70 is guided through irradiation vault 76 on rolls 82. Preferably, the irradiation of tubing 70 is at a level of from about 2 to 10 megarads (hereinafter "MR"); more preferably, from about 3.5–4 MR.

After irradiation, irradiated tubing 84 is directed over guide roll 86, after which irradiated tubing 84 passes into hot water bath tank 88 containing water 90. The now-collapsed irradiated tubing 84 is submersed in the hot water for a retention time of at least about 5 seconds, i.e., for a time period in order to bring the film up to the desired temperature, following which supplemental heating means (not illustrated) including a plurality of steam rolls around which irradiated tubing 84 is partially wound, and optional hot air blowers, elevate the temperature of irradiated tubing 84 to a desired orientation temperature of from about 240° F.–250° F. Thereafter, irradiated film 84 is directed through nip rolls 92, and bubble 94 is blown, thereby transversely stretching irradiated tubing 84 to form oriented blown tubing film 96. Furthermore, while being blown, i.e., transversely stretched, irradiated tubing 84 is drawn (i.e., in the longitudinal direction) between nip rolls 88 and nip rolls 98, as nip rolls 98 have a higher surface speed than the surface speed of nip rolls 92. As a result of the transverse stretching and longitudinal drawing, irradiated, biaxially-oriented, blown tubing film 96 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16. While bubble 94 is maintained between pinch rolls 92 and 98, blown tubing film 96 is collapsed by converging rolls 100, and thereafter conveyed through pinch rolls 98 and across guide roll 102, and then rolled onto wind-up roller 104. Idler roll 106 assures a good wind-up.

The film of the present invention is preferably irradiated to induce crosslinking (i.e., form a crosslinked polymer network), as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

The corona treatment of a film is performed by subjecting the surfaces of the film to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Figure 3:
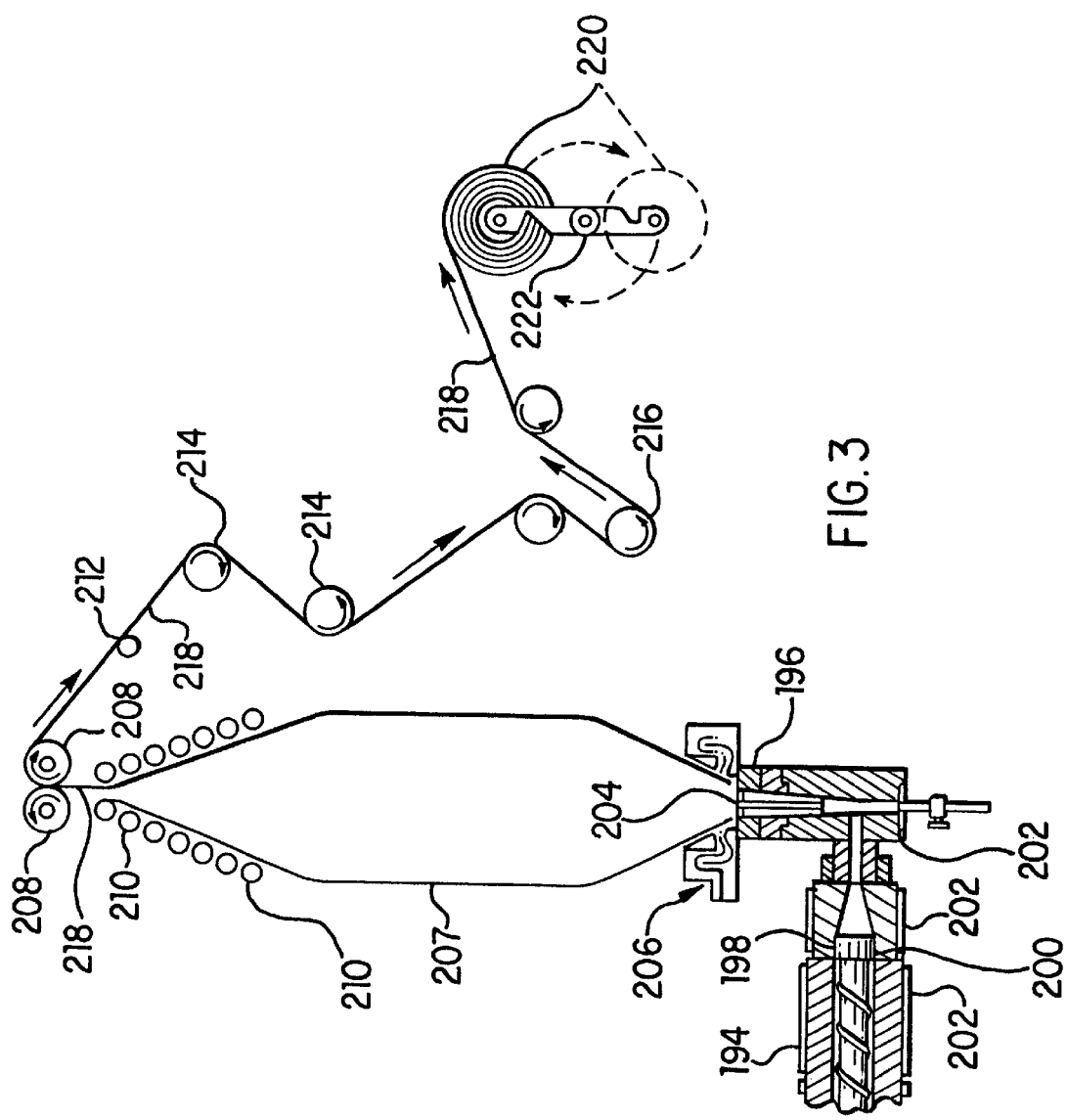
FIG. 3 illustrates a s schematic view of a preferred blown film process for making a second component film for use in the packaged product of the invention.

FIG. 3 illustrates a schematic view of a process useful in making a blown film which is preferably laminated to a film produced by the process illustrated in FIG. 2, in the production of a multilayer film in accordance with the present invention, e.g., the film illustrated in FIG. 1. In the process illustrated in FIG. 2, at least one extruder supplies molten polymer to coextrusion die 196 for the formation of a monolayer film of high density polyethylene. The extruders is preferably equipped with a screen pack 198, a breaker plate 200, and a plurality of heaters 202. The monolayer film is exuded between mandrel 204 and die 196, and the extrudate is cooled by cool air flowing from air ring 206. The resulting blown bubble 207 is thereafter guided into a collapsed configuration by nip rolls 208, via guide rolls 210. The collapsed tube is optionally passed over treater bar 212, and is thereafter passed over idler rolls 214, and around dancer roll 216 which imparts tension control to collapsed tube 218, after which the collapsed tube is wound into roll 220 via winding mechanism 222.

Although the multilayer film of the present invention can be produced by a full coextrusion method or extrusion coating method, a preferred method of making the multilayer film is by laminating together at least two separate films. The lamination is carried out using a conventional laminating process as known to those of skill in the art, and suitable laminating adhesives as are also known to those of skill in the art.

The multilayer film produced by the process illustrated in FIG. 2, described above, and a monolayer film produced by the process illustrated in FIG. 3, also described above, are preferably laminated to one another with a laminating adhesive, preferably a polyurethane-based adhesive. The resulting film, preferably having a thickness of about 6.5 mils, can be processed on vertical-form-fill-and-seal equipment, using hot melt adhesive, without substantially shrinking back from the adhesive. The laminate is suitable for packaging, via vertical-form-fill-and-seal, an explosive composition which is in the form of a thick, flowable slurry. The resulting package which does not burst when dropped from a height of 30 feet onto a hard surface (e.g., rock) or water.

In general, the multilayer film in accordance with the present invention can also be sealed to form a bag, pouch, casing, lidstock, etc. The sealing of film can be to itself or to another film or a non-film article. Other sealing means (i.e., other than the preferred means which utilizes a hot melt adhesive, as described above) include the use of a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. Both linear and shaped seals can be formed, as is known to those of skill in the art. In general, sealing and cutting of tubing to produce bags is disclosed in U.S. Pat. No. 3,552, 090, U.S. Pat. No. 3,383,746, and U.S. Ser. No. 844,883, filed Jul. 25, 1969, to OWEN, each of these two U.S. Patents as well as the U.S. Patent application, hereby being incorporated by reference thereto, in their entireties.

Figure 4:
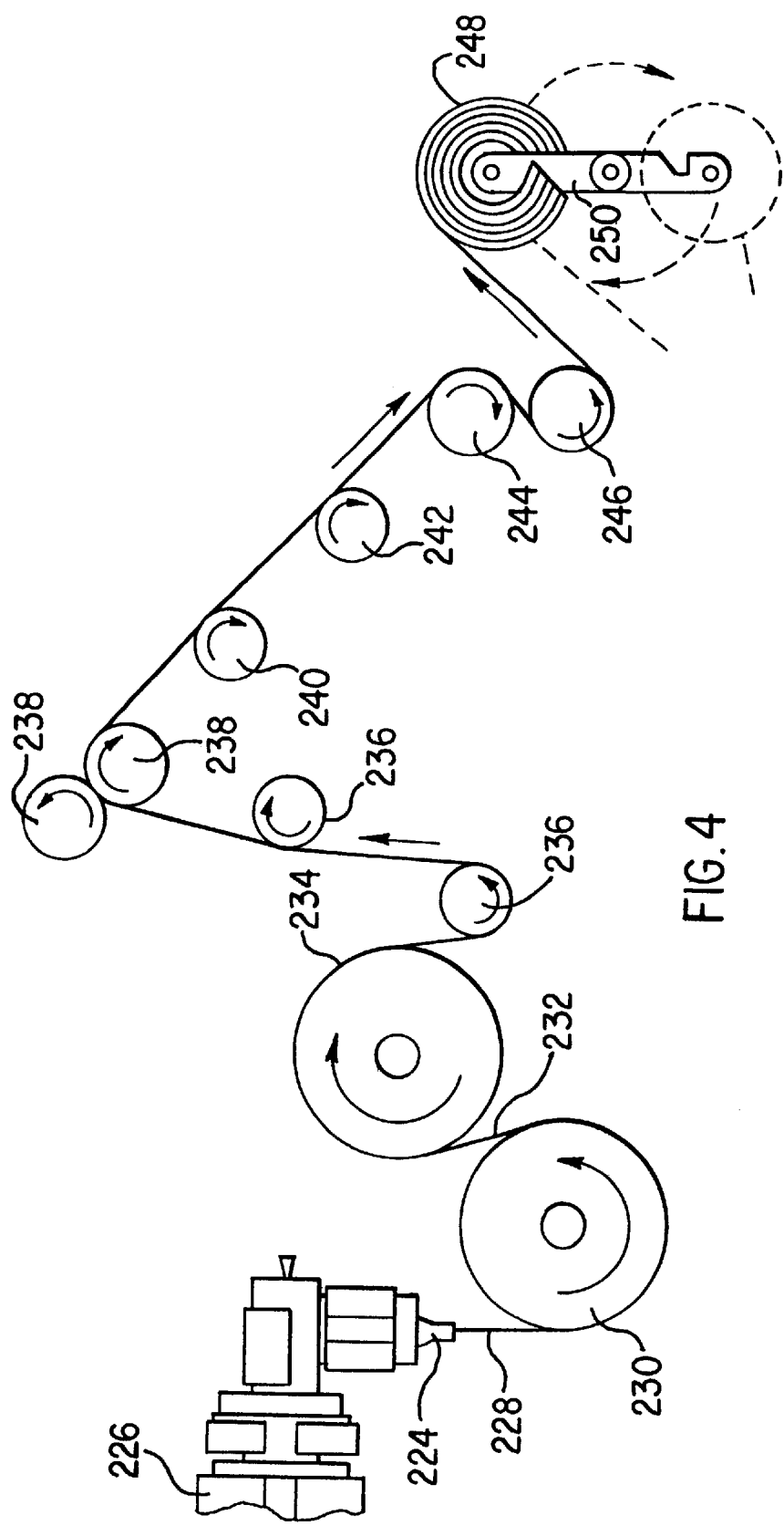
FIG. 4 illustrates a schematic view of a cast film process for making a film or component film for use in accordance with the present invention.

FIG. 4 illustrates a schematic view of a cast coextrusion process of film manufacture, in which various polymeric formulations are supplied to slot-shaped die 224, preferably from a plurality of extruders 226, only one of which is illustrated in FIG. 4. This cast process is a preferred process for making multilayer films and component films for use in the present invention. In FIG. 4, the number of extruders 226 is at least as great as the number of different chemical compositions present in the various layers of the multilayer film, but can be fewer than the number of layers of the film in the event that a stream from an extruder is split to form two different film layers. Typically, the extruders are single screw extruders which convert polymer granules or pellets into a continuous uniform melt under elevated temperatures and pressure. The molten masses formed within the various extruders are converged into a plurality of layers in a stream which is forced into flat laminar flow for the width of the slot of die 224, and thereafter forced through the slot of die 224, to yield the desired shape. After passing through the slot of die 224, melt 228 passes downwardly vertically and tangentially contacts chill roll 230 which quenches melt 228, forming multilayer film 232 thereon. Chill roll 230 is highly polished and water-cooled, and rotates with melt 228 at the speed at which melt 228, and film 232, are drawn forward. Film 232 then leaves the surface of chill roll 230, and thereafter may contact the surface of from one to three supplemental chill rolls 234 (only one supplemental chill roll 234 is illustrated in FIG. 19), which are also water-cooled and highly polished, and which further cool multilayer film 232, which thereafter passes over guide rolls 236 and through the nip of nip rolls 238. Film 232 is thereafter directed over guide rolls 240 and 242. Thereafter, film 232 passes between a nip between rubber nip roll 244 and stainless steel nip roll 246, and is then wound up into roll 248 by winder 250. The width of the cast film web is determined by the die slot width. The thickness of film 232 is determined by the relationship between the output of extruder 226 and the takeaway speed of the film 232.

Figure 5:
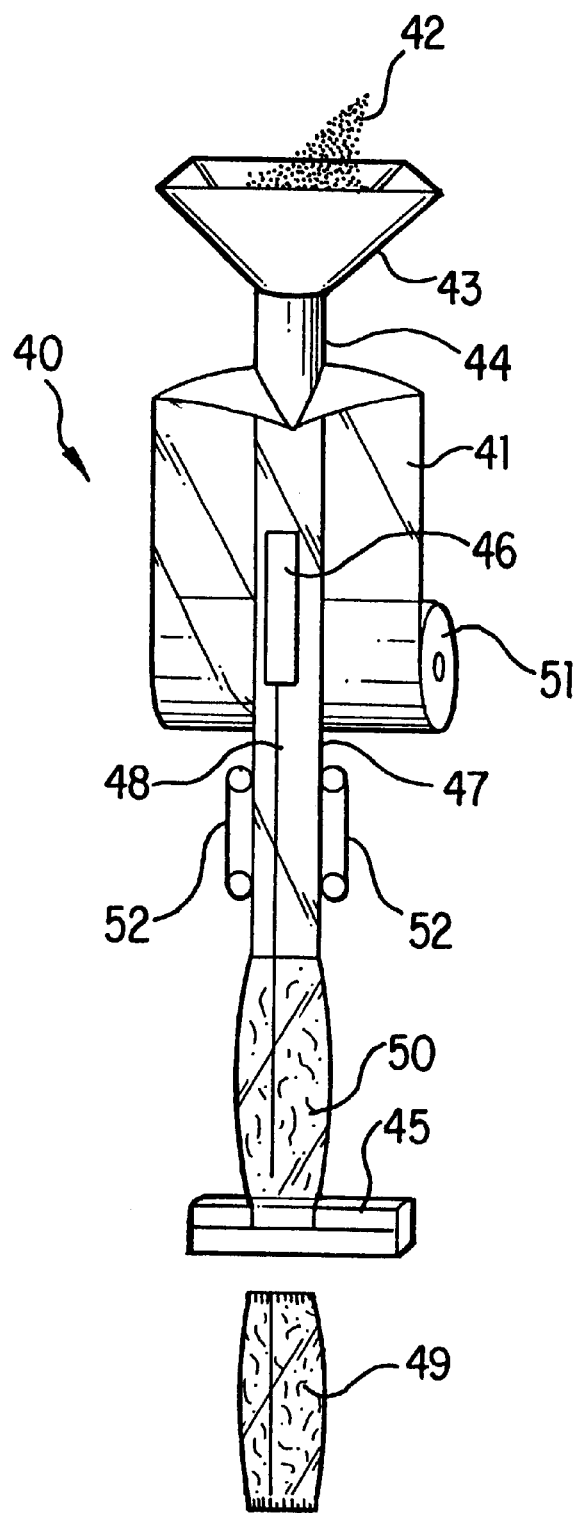
FIG. 5 illustrates a perspective view of an apparatus for use in a packaging process in accordance with the present invention.

FIG. 5 illustrates a vertical form fill and seal apparatus to be used in packaging process according to the present invention. Vertical form fill and seal equipment is well known to those of skill in the packaging arts. The following documents disclose a variety of equipment suitable for vertical form fill and seal: U.S. Pat. No. 2,956,383; U.S. Pat. No. 3,340,129 to J. J. GREVICH; U.S. Pat. No. 3,611,657, to KIYOSHI INOUE, et. al.; U.S. Pat. No. 3,703,396, to INOUE, et. al.; U.S. Pat. No. 4,103,473, to BAST, et. al.; U.S. Pat. No. 4,506,494, to SHIMOYAMA, et. al.; U.S. Pat. No. 4,589,247, to; U.S. Pat. No. 4,532,752, to TAYLOR; U.S. Pat. No. 4,532,753, to KOVACS; U.S. Pat. No. 4,571, 926, to SCULLY; and Great Britain Patent Specification No. 1 334 616, to de GROOT, et. al., each of which is hereby incorporated in its entirety, by reference thereto.

In FIG. 5, a vertical form fill and seal apparatus 40 is schematically illustrated. Apparatus 40 utilizes multilayer film 41 according to the present invention. Product 42, which is preferably a slurry which is explosive, is supplied to apparatus 40 from a source (not illustrated), from which a predetermined quantity of product 42 reaches upper end portion of forming tube 44 via funnel 43, or other conventional means. The packages are formed in a lower portion of apparatus 40, and flexible sheet material 41 (a multilayer film in accordance with the present invention) from which the bags or packages are formed, is fed from roll 51 over certain forming bars (not illustrated), is wrapped about forming tube 44, and is provided with longitudinal seal 47 by longitudinal heat sealing apparatus 46, resulting in the formation of vertically-oriented tube 48. Sealing apparatus 46 preferably extrudes a pair of streams of molten hot-melt adhesive between the overlapping regions of sheet material 41, to result in a high strength longitudinal seal which is highly resistant to failure upon dropping the resulting package onto a hard surface from a distance of, for example, 30 feet. Although FIG. 5 illustrates end seal bars 45 which are to close and seal horizontally across the lower end of vertically-sealed tube 48, preferably this seal is made using a metal clipping operation. In either event, the sealing forms pouch 50, which is thereafter immediately packed with product 42. Film drive belts 52, powered and directed by rollers, as illustrated, advance tube 48 and pouch 50 a predetermined distance, after which FIG. 5 again illustrates end seal bars 45 (preferably, a clipping operation is used, as stated above) which are to close and simultaneously seal horizontally across the lower end of vertically-sealed tube 48 as well as simultaneously sealing horizontally across upper end of sealed pouch 49, to form a product packaged in sealed pouch 49. The next pouch 50, thereabove, is then filled with a metered quantity of product 42, forwarded, and so on. It is also conventional to incorporate with the end seal bars (or metal clipping means) a cut-off knife (not shown) which operates to sever a lower sealed pouch 49 from the bottom of upstream pouch 50.

Figure 6:
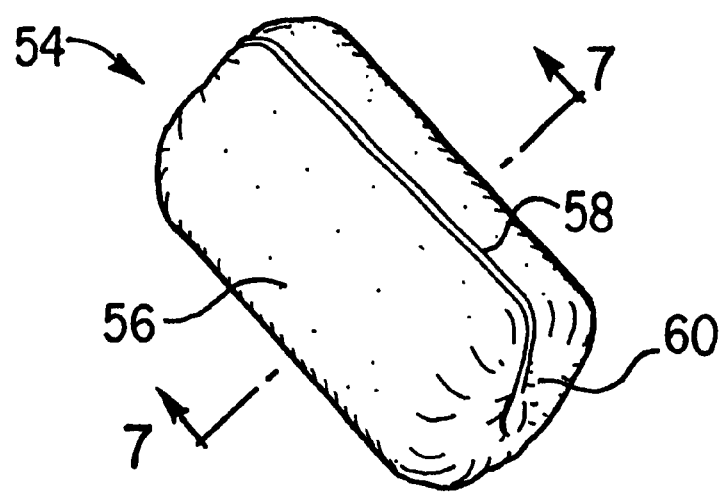
FIG. 6 illustrates a perspective view of a packaged product in accordance with the present invention.

FIG. 6 illustrates a preferred embodiment of a packaged product 54 of the present invention, in which an explosive article is surrounded by a film. Film 56 is present in the form of a chub, having longitudinal (machine direction) lap seal 58, and end seals of gathered film, formed by tightly crimped metal clips 60. Preferably, film 56e is a multilayer film in accordance with the present invention, with packaged product 49 preferably having been produced using a vertical form fill and seal apparatus, in accordance with the packaging process of the present invention as described above.

Figure 7:
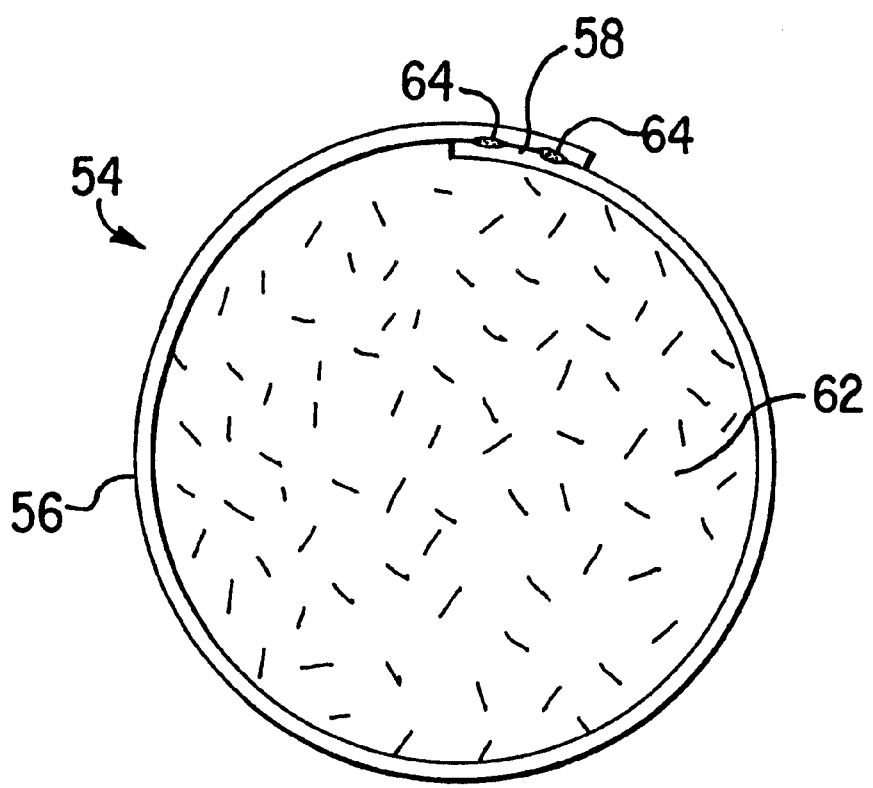
FIG. 7 illustrates a cross-sectional view through section 7—7 of FIG. 6.

FIG. 7 illustrates a cross-sectional view through section 7—7 of FIG. 6. In FIG. 7, film 56 surrounds explosive composition 62, with lap seal 58 including two solidified beads 64 of hot-melt adhesive.

In the example below, unless stated otherwise, all percentages, parts, etc. are by weight.

EXAMPLE

The preparation of a first component film was carried out by casting an annular, two-layer tape using a coextrusion die, in accordance with the process illustrated in FIG. 2, discussed above. The outside layer of the tape contained a major proportion (i.e., 87 weight percent) DOWLEX® 2045 linear low density polyethylene ("LLDPE#1"), obtained from Dow Plastics of Freeport, Tex., and a minor proportion (10 weight percent) of ESCORENE® LD318.92 ethylene/vinyl acetate copolymer ("EVA#1") having a vinyl acetate content of 9 weight percent, obtained from the Exxon Chemical Corporation of Houston, Tex. LLDPE#1 and EVA#1 were present in a blend with 3 weight percent of 10–183 ACP SYLOID Concentrate antiblock masterbatch ("Color Concentrate"), obtained from Teknor Color, of Pawtuxet, R.I. The inside layer of the tubing was 100 weight percent ESCORENE® LD 761.36 ethylene/vinyl acetate copolymer ("EVA#2") having a vinyl acetate content of 28 weight percent, obtained from the Exxon Chemical Company, of Houston, Tex. In order to prevent the inside layer of the tape from self-adhering after extrusion but prior to orientation, the inside surface of the tubular tape was coated with powdered cornstarch, in accordance with U.S. Pat No. 4,765,857, to Ferguson, which is hereby incorporated, in its entirety, by reference thereto. The tape was then irradiated to a level of 4.0 megarads. The tubular tape was then flattened and reheated to 115° C. in an oven, and then blown into a bubble. The bubble was expanded to about 3× its original dimensions, in both the machine and transverse directions, for a total orientation of 9× (i.e., 900%). The collapsed and flattened tubing adhered to itself because the expansion of the film reduced the concentration of the corn starch powder to a level low enough that self-welding occurred. Hence, ply-separation was not required, and a single-wound film roll was produced, this film being the first component film. Thus, this first component film had a total of 4 layers, with the outer film layers being of identical chemical composition and thickness, and with the two inner film layers also being of identical chemical composition and thickness.

A second component film was produced using the blown-film process as illustrated in FIG. 4, described above. This second component film was a monolayer film, and was prepared by blending HiD®9659 high density polyethylene, obtained from the Chevron Chemical Company of Houston, Tex.) in an amount of 70% by weight, with 30% by weight of a white concentrate. The white concentrate was A130175 white color concentrate containing 50 weight percent high density polyethylene and 50 weight percent titanium dioxide, obtained from the Ampacet Corporation, of Tarrytown, N.Y.

The first component film was laminated to the second component film using a conventional laminating process and a conventional laminating adhesive, resulting in a multilayer non-crosslaminated film. The machine direction of each of the films was in the same direction in the resulting laminated film, i.e., the component films were not cross-laminated with respect to one another. The laminating adhesive was a solvent-based adhesive of three components by weight; the three components were: 37% ADCOTE® 545-E Adhesive with 60% solids, 3.7% Catalyst F, diisocyanate with 75% solids, and 59.2% ethyl acetate solvent; all three components were obtained from Morton International of Chicago, Ill.

The resulting multilayer non-crosslaminated film had a total of 6 layers (including one layer of laminating adhesive), exhibited high stiffness (i.e., high modulus) and outstanding tear resistance, together with high gloss and good printability. The multilayer non-crosslaminated film had the following layer compositions and thicknesses:

TABLE 1

| LAYER COMPOSITION | LAYER THICKNESS (mils) |
|---|---|
| First Component Film | |
| 87% LLDPE #1, 10% EVA#1, 3% Antiblock Concentrate | 1.29 |
| EVA #2 | 0.46 |
| 87% LLDPE, 10% EVA#1, 3% Antiblock Concentrate | 1.26 |
| Laminating Adhesive between First and Second Component Films | |
| Laminating Adhesive | 0.20 |
| Second Component Film | |
| blend of 70% HDPE and 30% White Concentrate | 2.98 |

Moreover, the multilayer non-crosslaminated film had the following physical properties:

TABLE 2

PHYSICAL PROPERTIES OF LAMINATED MULTILAYER FILM

| Physical Properties | Ex. 1 |
| --- | --- |
| Gauge (mils) | 6.53 |
| Volume % Polyolefin, EVA | 97 |
| Laminating Adhesive (% of total film) | 3 |
| Tensile strength at break (psi) | |
| (MD) | 9,270 |
| (TD) | 9,320 |
| % Elongation at break | |
| (MD) | 230 |
| (TD) | 210 |
| Young's Modulus, psi X1000 | |
| (MD) | 65 |
| (TD) | 78 |
| Tear Propagation | |
| MD (grams) | 408 |
| TD (grams) | 383 |
| Average of MD and TD (grams) | 396 |
| Instrumented Impact Strength: | |
| peak force | 96.7 lb |
| energy to break | 3.61 ft-lb |
| Normalized impact strength | 0.5528 |

The multilayer non-crosslaminated film is especially useful for the packaging of an explosive flowable slurry, using a KARTRIDG PACK® vertical-form-fill-and-seal packaging machine. The packaging is carried out by bringing the film over a collar, and forming a lap seal along overlapping edge regions, i.e., the seal being formed in the machine direction of the multilayer non-crosslaminated film. The seal is preferably formed by extruding two parallel molten beads of NOVACOR® SC7250 SCLAIRCOAT polyethylene, obtained from Nova Chemical, of Alberta, Canada, with a sales office in High Point, N.C.

The multilayer non-crosslaminated film described above was compared with a comparative film, with respect to sealing performance using a hot melt adhesive. The comparative film was the first component film tested above, i.e., without the monolayer high density polyethylene film laminated thereto. The test compared the difference in the shrinkage response of the multilayer non-crosslaminated film versus the comparative film. A molten bead of a conventional hot melt adhesive was used to form a lap seal of the multilayer non-crosslaminated film to itself. Although the multilayer non-crosslaminated film exhibited slight "puckering" due to slight shrinkage caused by exposure to the molten hot melt adhesive, the overlapped regions of the multilayer non-crosslaminated film did not substantially shrink back away from one another, and the resulting seal appeared to be continuous and strong. In contrast, the use of the same hot melt adhesive to form a lap seal of the comparative film, resulted in a film which exhibited substantial puckering and shrinkage, with the resulting seal being weak and intermittent. Thus, relative to the comparative film, the multilayer non-crosslaminated film in accordance with the present invention exhibited superior performance when sealed with a molten bead of hot melt adhesive.

The preferred multilayer non-crosslaminated film described above can be provided with additional layers to further enhance its barrier properties to atmospheric gases, such as nitrogen, oxygen, carbon dioxide, water vapor, etc., using conventional barrier layers such as polyvinylidene chloride, ethylene/vinyl alcohol copolymer, polyamide, etc. The multilayer non-crosslaminated film can also be provided with any other additional film layers to provide higher modulus, enhanced printability, sealability by alternative means, additional toughness (although the multilayer non-crosslaminate is already very tough, as is apparent from the impact strength properties in Table 2, above), etc. In addition, the multilayer non-crosslaminated film could be annealed to further reduce its tendency to shrink, or could be produced using only blown film production processes, or, still more preferably, using a cast film process as described above.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A packaged product comprising:
    (A) a non-crosslaminated film comprising at least one member selected from the group consisting of linear low density polyethylene, high density polyethylene, homogeneous ethylene/alpha-olefin copolymer, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, and ethylene/styrene copolymer, the non-crosslaminated film having a total free shrink at 185° F. of less than about 5 percent, and a thickness of from 3 to 20 mils, and wherein the film has a tensile strength of at least 4,000 psi and an average tear propagation of from about 50 to 800 grams; and
    (B) a product surrounded by the non-crosslaminated film, the product comprising an explosive composition; and wherein non-crosslaminated film is sealed to itself, and wherein the packaged product is a chub having a circular cross-sectional shape.

2. The packaged product according to claim 1, wherein the non-crosslaminated film is sealed to itself in a lap seal comprising a thermoplastic adhesive, and wherein the lap seal runs the length of the package.

3. The packaged product according to claim 1, wherein the explosive composition comprises at least one member selected from the group consisting of ammonium nitrate, nitroglycerine, diethylene glycol dinitrate, nitroglycerin, trinitrotoluene, nitrocellulose, mercury fulminate, lead azide, silver acetylide, diazodinitrophenol, nitrosoguanidine, lead styphnate, and pentaerythritol tetranitrate, and a mixture of potassium nitrate, charcoal, and sulfur.

4. The packaged product according to claim 3, wherein the explosive composition comprises ammonium nitrate.

5. The packaged product according to claim 3, wherein the package comprises a closure clip on a first end of the chub and a closure clip on a second end of the chub.

6. The packaged product according to claim 1, wherein the non-crosslaminated film has a total free shrink, at 185° F., of from about 0 to about 4 percent.

7. The packaged product according to claim 6, wherein the non-crosslaminated film has a total free shrink, at 185° F., of from about 0 to about 3 percent.

8. The packaged product according to claim 1, wherein the non-crosslaminated film has an average tensile strength at break of at least 4000 psi.

9. The packaged product according to claim 1, wherein the non-crosslaminated film has a tear propagation of from about 50 to 800 grams.

10. The packaged product according to claim 1, wherein the non-crosslaminated film has a Young's modulus of at least about 30,000 psi.

11. The packaged product according to claim 1, wherein the film has a thickness of from about 3 to 12 mils.

12. The packaged product according to claim 11, wherein the film has a thickness of from about 4 to 8 mils.

13. The packaged product according to claim 12, wherein the film has a thickness of about 6.5 mils.

14. The packaged product according to claim 1, wherein the film has a tensile strength of from about 4,000 to 15,000 psi.

15. The packaged product according to claim 14, wherein the film has an average tear propagation of from about 200 to 800 grams.

16. The packaged product according to claim 15, wherein the film comprises linear low density polyethylene.

17. The packaged product according to claim 16, wherein the film further comprises ethylene/vinyl acetate copolymer.

18. The packaged product according to claim 1, wherein the film has a tensile strength of from about 7,000 to 11,000 psi.

* * * * *